July 26, 1966 W. PENNINGTON 3,262,267
ROCKET NOZZLE SHUTOFF DEVICE
Filed Jan. 13, 1965 2 Sheets-Sheet 1

INVENTOR.
WILLIAM PENNINGTON
BY Harry A. Herbert Jr.
Sherman H. Goldman
ATTORNEYS 3,262,267
ROCKET NOZZLE SHUTOFF DEVICE
William Pennington, Los Angeles, Calif., assignor to the United States of America as represented by the Secretary of the Air Force
Filed Jan. 13, 1965, Ser. No. 425,361
3 Claims. (Cl. 60—35.6)

This invention relates to rocket engines, and more particularly to a device for abruptly reducing or shutting off the thrust of a rocket engine during burning.

While it is adaptable to either liquid or solid fuel rocket engines, it is especially useful for controlling solid fuel types. The combustion of liquid fuel can be conveniently controlled by cutting off the fuel to a combustion chamber by closing valves in the supply line. It is not so easy with solid or granular fuel for, once ignited, the entire fuel supply which is contained in the combustion chamber, must be consumed before thrust ceases unless the nozzle can be closed. It is upon the latter concept, that of stopping the flow of gases from the exit orifice, that this invention is founded.

Several methods of accomplishing this were considered. One was a lid or flapper, but it was discarded when the weight, the apparatus for hinging the flap and actuating it, was considered. Of the various forms of stoppers, an inflatable rubber ball, forced in the exit orifice by the escaping gases, was chosen since a hollow sphere would have more strength for its weight than any other shape and could be packed, uninflated at the time of manufacture, in the propellant. In addition, an inflatable stopper takes up little space and weight, and at the same time can be swept into the orifice when inflated by the gases from the unburned propellant without the addition of any other means for forcing it into the orifice. Furthermore, the fit of a hollow sphere in the orifice opening is assured without any change in the size or shape of the orifice. This is an important consideration for the size and shape of a rocket motor's exit orifice is of paramount importance.

This device would be particularly useful in controlling retrorockets used on such missiles as the Minuteman, or in separating the booster from the warhead in such missiles. Although a rubber ball would have a limited life in the hot gases of a solid fuel retrorocket, it is estimated that one with ¼ to ½ inch walls would last 60 seconds, and that 10 seconds would suffice to separate such a rocket engine from the warhead of a Minuteman missile.

It is an object of this invention, therefore, to provide a means for terminating the thrust of a solid fuel rocket before its fuel supply is exhausted.

It is a further object to furnish a means for shutting off the propulsion of a solid fuel rocket motor by the addition of a minimum of weight and bulk.

It is also an object to furnish such a device which can be easily manufactured of readily obtainable materials.

Other objects and advantages of this invention will become apparent upon consideration of the following description and the attached drawings in which.

Figure 6:
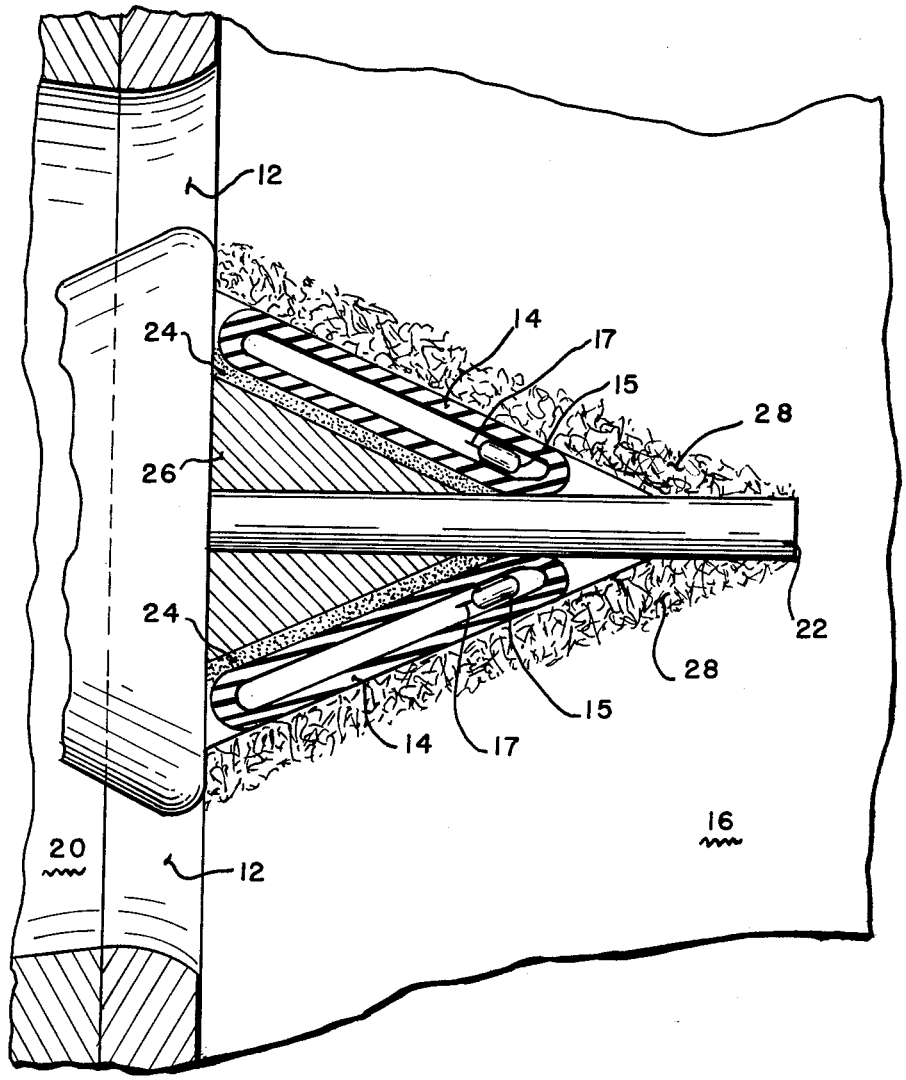
FIG. 6 is an enlarged view of the device showing the parts in more detail.

In the drawings, 10 represents a rocket motor, and 12 two of several exit orifices entering the main orifice or nozzle 20. Two of several folded hollow spheres or balls are shown as 14 in FIGS. 1 and 6, and in various stages of expansion in the remaining figures. A gas generating cartridge 15 is shown embedded in spheres 14 and a time capsule, or squib 17, which is ignited on command by a conventional electrical signaling means or switch, actuates the cartridge to release gas from the cartridge 15 to inflate the spheres 14. The spheres are shown attached to an igniter structure 22 by adhesive 24 so that full inflation of the spheres is required to break them loose before they can be swept into the exit orifices 12.

Igniter structure 22 is essentially a hollow tube fastened to rocket motor housing 10. It contains the usual ingredients and timing mechanism to ignite the solid rocket fuel 28 contained in the combustion chamber 16 at the proper time. The combustion chamber 16 contains a solid fuel for producing high velocity thrust gases.

Figure 5:
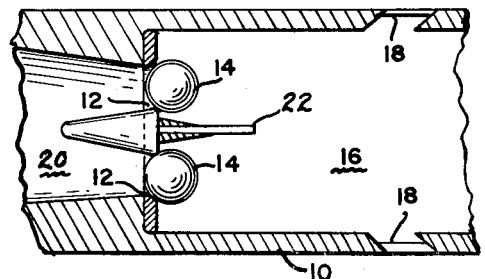
FIG. 5 shows two frangible exits from the combustion chamber to relieve the pressure built up in the chamber when the exit orifices are closed.

In FIG. 5, two frangible exits 18 are shown and are designed to relieve the pressure built up in the combustion chamber when the exit orifices are closed. These exits 18 may have a backward slant as shown to give a retroactive effect useful in separating the rocket from the warhead.

Figure 1:
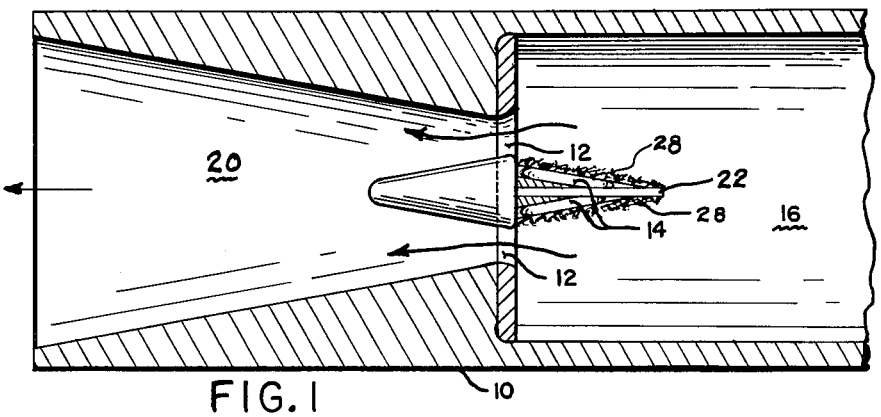
FIG. 1 is a sectional view of a typical rocket engine showing the invention in a folded or quiescent state.
Figure 2:
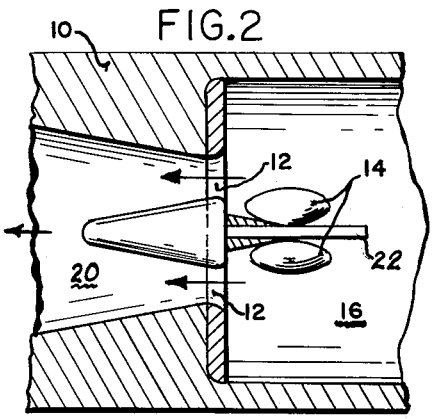
FIG. 2 shows the invention after inflation of the spheres has begun.
Figure 3:
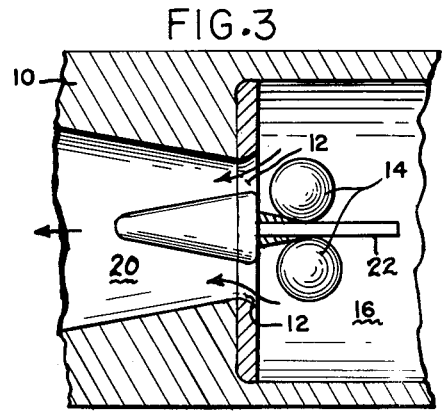
FIG. 3 shows the completed inflation of the spheres.
Figure 4:
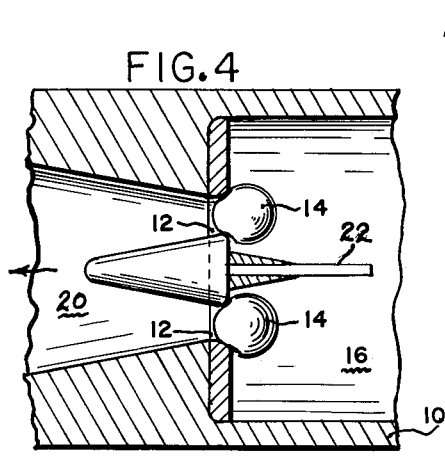
FIG. 4 shows the invention swept into the outlet orifice by the escaping gases and completely blocking further thrust.

Referring to FIG. 1, the two hollow spheres, or rubber balls 14, shown folded and embedded in the propellant are inflated at the proper time by the cartridges 15, thus breaking the bonds 24 which hold the balls in place. This action is shown in FIG. 2 where the balls 14 are beginning to inflate. As the balls are fully inflated, as shown in FIG. 3, they are swept by the high velocity gases into the orifice nozzles 12, as shown in FIG. 4, thus effectively shutting off further thrust.

While the above-described embodiment of this invention relates to a small retrorocket, suitable for a Minuteman missile, it is to be understood that it is not confined to retrorockets but to any rocket engine whether a retrorocket or booster type, and whether used on a Minuteman missile or otherwise. Additionally, the means for actuation of the gas generating means may be of any conventional type.

Now, having described a simple, effective device for cutting off the thrust of a solid fuel rocket, what I claim is:

1. In a rocket motor having a high velocity gas generating chamber and a reaction nozzle connected therewith: means for terminating the flow of gas through said nozzle comprising at least one inflatable member positioned within said gas generating chamber, a solid fuel element initially surrounding said member, means for burning said solid fuel element, and gas generating means contained within said member for subsequently inflating said member after burning away at least part of said fuel element to release said member to be moved by the high velocity gas flow whereby said member is forced into the nozzle to produce blockage of said gas flow through said nozzle.

2. A device as described in claim 1, including means for actuating said gas generating means.

3. A device as described in claim 2, including means for inhibiting movement of said inflatable member until said member is in a fully inflated condition.

References Cited by the Examiner
UNITED STATES PATENTS
2,737,019   3/1956   Billman.
2,857,119   10/1958  Morguloff.
3,053,488   9/1962   Cox _____ 60—35.6

MARK NEWMAN, Primary Examiner.
C. R. CROYLE, Assistant Examiner.